United States Patent
Pedemonte

(10) Patent No.: US 6,754,990 B2
(45) Date of Patent: Jun. 29, 2004

(54) ACTUATOR FOR GATES, DOORS AND THE LIKE

(75) Inventor: Carlo Pedemonte, Alessandria (IT)

(73) Assignee: Genius s.r.l. (IT)

(*) Notice: Subject to any disclaimer, the term of this patent is extended or adjusted under 35 U.S.C. 154(b) by 48 days.

(21) Appl. No.: 10/149,274

(22) PCT Filed: Dec. 7, 2000

(86) PCT No.: PCT/EP00/12408

§ 371 (c)(1),
(2), (4) Date: Jun. 7, 2002

(87) PCT Pub. No.: WO01/42608

PCT Pub. Date: Jun. 14, 2001

(65) Prior Publication Data

US 2002/0178655 A1 Dec. 5, 2002

(30) Foreign Application Priority Data

Dec. 9, 1999 (IT) .................................. AL99A0009

(51) Int. Cl.[7] ............................................. E05F 11/00
(52) U.S. Cl. .............................. 49/337; 49/336; 49/342
(58) Field of Search ....................... 49/340, 333, 341, 49/345, 342, 334, 335, 336, 337, 339, 139, 359, 28, 324, 140, 358; 74/39.14, 39.16, 39.17; 256/73, 1; 16/62, 64, 79

(56) References Cited

U.S. PATENT DOCUMENTS

| 2,996,047 | A | * | 8/1961 | Denniston | 49/340 |
| 4,403,449 | A | * | 9/1983 | Richmond | 49/340 |
| 4,735,018 | A | * | 4/1988 | Duncan et al. | 49/340 |
| 4,850,094 | A | * | 7/1989 | Lybecker | 49/340 |
| 4,934,203 | A | * | 6/1990 | Bailey et al. | 49/340 |
| 5,375,374 | A | * | 12/1994 | Rohraff, Sr. | 49/340 |
| 5,804,938 | A | * | 9/1998 | Richmond et al. | 49/340 |
| 6,067,753 | A | * | 5/2000 | Hebda | 49/345 |
| 6,138,412 | A | * | 10/2000 | Rieckmann et al. | 49/349 |
| 6,256,928 | B1 | * | 7/2001 | Skeem | 49/341 |

* cited by examiner

*Primary Examiner*—Hugh B. Thompson, II
(74) *Attorney, Agent, or Firm*—Shlesinger Fitzsimmons & Shlesinger

(57) ABSTRACT

An actuator for gates, doors and the like, with at least one wing. The actuating motor (14) and the associated motor reduction unit (15) are housed inside as half-arm (2) which turns on a fixed support (9) in an oscillating way about a substantially vertical swinging axis (10). Advantageously, the electric motor (14) operates a maneuvering worm screw (12) which is carried by said half-arm (2) and engages a corresponding helical gear (13) coaxial with the swinging axis (10) and is fastened to the fixed support of the half-arm (2) by a torque-limiting device which prevents excessive stresses on the actuator as a result of external forces and also makes it possible to release the helical gear for manual emergency actuation of the wing.

22 Claims, 6 Drawing Sheets

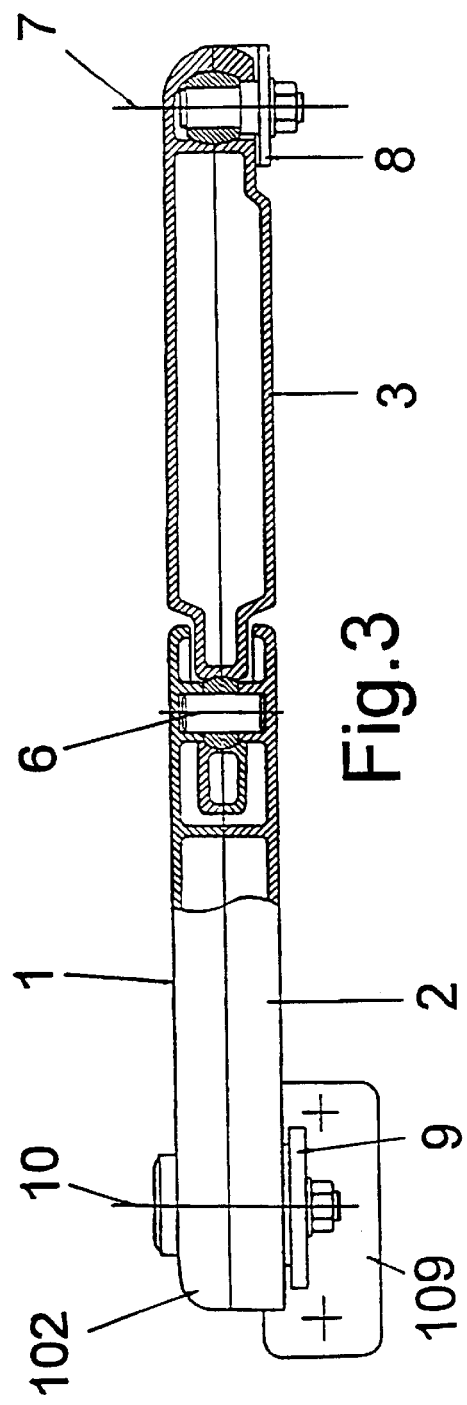
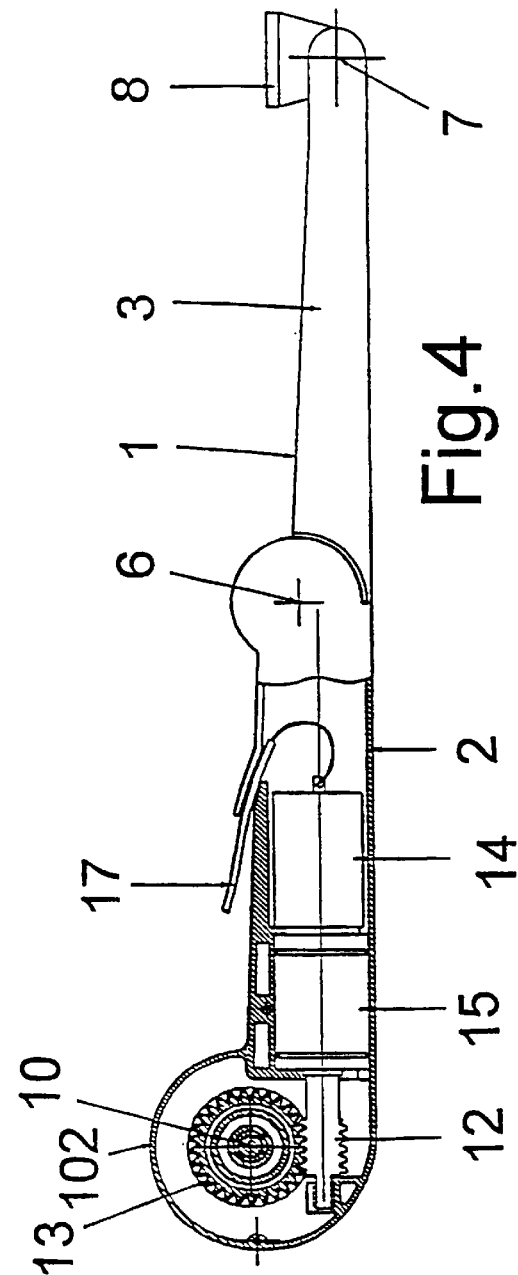

ACTUATOR FOR GATES, DOORS AND THE LIKE

This application is a 371 of PCT/EP00/12408, filed Dec. 7, 2000.

The subject of the invention is an actuator for gates, doors and any other similar barriers for closing entrances or openings with at least one wing (rotating or sliding), or the like, the said actuator comprising an arm or half-arm or so-called actuator arm, hinged with its rear end to a fixed support in an angularly displaceable manner, being displaceable by means of an electric motor and a reduction unit. The arm can be an articulated arm having a so-called drawing arm articulated with its front end to the wing of the door, and with its rear end, by means of an intermediate folding articulated joint, to the front end of the actuator arm.

DE-U-295 13 302 discloses an actuator for a window with a rotating wing. The actuator comprises a foldable arm, which is hinged to a fixed support on one side and to the wing on the other side. An actuating motor and a reduction unit are arranged in the half-arm hinged to the fixed support and are operatively connected to the intermediate articulation between the two half-arms.

DE-A-197 24 439 discloses an actuator for a bus door, wherein a clutch system is provided between the door swinging pivot and the coaxial gear to enable the door to be freely rotated in case of emergency.

The purpose of the invention is to provide an actuator which, as a whole, presents smaller overall dimensions, and the arm of which affords greater sturdiness so that it can be used as a stay for blocking the wing in the closed position, whilst it may also be installed on supports, for instance, on supporting posts of small dimensions, in any case preventing damage if the actuator half-arm were to be subjected to rotational stress exerted by excessive external forces and enabling its angular displacement by the said external forces in the direction of opening and closing of the wing, at the same time making possible release of the actuator half-arm from the respective operating motor for easy manual emergency displacement of the wing.

According to one characteristic of the invention, the above purpose is achieved by the fact that the electric actuating motor and the associated reduction unit are carried by the arm, preferably by the actuator half-arm and are preferably, housed in a correspondingly shaped and sized recess of the arm and preferably of the actuator half-arm itself.

According to a preferred embodiment of the invention, the electric motor operates, by means of the reduction unit, a manoeuvring worm screw which is carried by the actuator half-arm and engages with a corresponding helical gear coaxial to the swinging axis of the actuator half-arm, and is blocked, in a way so that it cannot turn, to the fixed support of the aforesaid half-arm itself.

According to another characteristic of the invention, the helical gear is mounted on the fixed support of the actuator half-arm by means of a torque-limiting device regulated in such a way as to enable rotation of the helical gear together with the associated worm screw, and hence together with the actuator half-arm, when the latter is subjected to rotational stresses exerted by external forces greater than a pre-set maximum allowable stress of the actuator half-arm itself.

Preferably, according to a preferred embodiment of the invention, the torque-limiting device is also used to disengage the actuator half-arm intentionally from its fixed support and so to enable its free and. easy rotation about its swinging axis when it is desired to displace the wing manually about its oscillating axis in cases of emergency, for example, in the case of absence of electric current. For this purpose, according to the invention, the torque-limiting device set between the helical gear and the fixed support of the actuator half-arm, as well as being disengageable automatically by the action of a pre-set maximum safety moment exerted on and exerted by the actuator half-arm, is associated to releasing means for pre-arrangement of the emergency manoeuvre which can be operated manually, for example by means of a suitable, possibly ciphered, wrench and are designed to disengage and deactivate the aforesaid torque-limiting device.

Both the torque-limiting device and the releasing means associated thereto for its manual disengagement in the event of emergency may be built in a very wide variety of ways suited for the purpose.

According to a preferred embodiment of the invention, the helical gear is fixed to a gear casing on which the rear end of the actuator half-arm is mounted, in such a way that it is free to turn, the said gear casing being in turn mounted, so that it is free to turn and is axially sliding, on a hinge pin that is coaxial with the swinging axis of the actuator half-arm and fastened to the fixed support of the said half-arm, whilst the torque-limiting device is made up of two toothed annular disks, which are set one on top of the other and are coaxial with the swinging axis of the actuator half-arm, one of the disks being fastened to the fixed support of the said half-arm, and the other being fixed to the gear casing, the said annular disks meshing together by means of their ring gears which are set facing head-on to one another, the said ring gears being provided with radial teeth having inclined sides, there being provided an engaging spring which exerts axial thrust on the gear casing in the direction of mutual engagement of the two toothed annular disks set on top of one another, consequently blocking the helical gear, in such a way that it is not able to turn, to the fixed support of the actuator half-arm, but enabling mutual disengagement of the two toothed disks by means of a corresponding movement of axial yielding of the gear casing against the action of the engaging spring, and hence enabling jerking rotation of the helical gear about the hinge pin as a result of a maximum pre-set torque exerted from outside, for example manually, on the actuator half-arm, and from this, by means of the worm screw, on the helical gear itself.

To enable manual emergency angular displacement of the wing and the corresponding oscillating movement of the actuator half-arm on its fixed fulcrum, the two toothed annular disks of the above-described torque-limiting device are disengaged from one another, for this purpose displacing the gear casing axially on the hinge pin against the action of the engaging spring and by manually controlled releasing means, and keeping the aforesaid casing in a position of disengagement of the torque-limiting device, thus enabling the gear casing, and hence the helical gear, to rotate freely together with actuator half-arm about the swinging axis of the latter.

Also the above mentioned releasing means for manual disengagement of the torque-limiting device may be built in any suitable way whatsoever. In a preferred example of embodiment of the invention describe above, the aforesaid releasing means for manual emergency disengagement of the torque-limiting device consist of a face cam mounted so that it can, turn manually between the gear casing or a part connected to the latter, consisting in particular of a part of the rear hinged end of the actuator half-arm, and the head end of the hinge pin fixed to the support of the actuator half-arm, the said cam presenting a profile such as to enable, in one first angular position of the said cam, mutual engagement of the two toothed disks of the torque-limiting device by the action of the respective engaging spring, whilst it displaces and withholds, in a second angular position, the gear casing axially on the hinge pin and against the action of the engaging spring in a position of disengagement of the torque-limiting device.

In the preferred embodiment of the invention described above, both the automatic disengagement and the intentional disengagement by manual emergency means for releasing the torque-limiting device set between the helical gear and the fixed support of the actuator half-arm require a limited axial displacement of the gear casing, and hence of the respective hinged rear end of the actuator half-arm, on the fixed hinge pin along the respective swinging axis.

Also this axial displacement of the hinged rear end of the actuator half-arm may be enabled from a constructional standpoint in any suitable manner whatsoever, even by means of corresponding allowances and tolerances. According to an embodiment of the invention, however, for this purpose the intermediate articulated joint for folding of the foldable arm of the articulated actuator or for the fixing to the wing and/or the joint articulating the drawing half-arm to the wing are made like ball-and-socket joints or else like Cardan joints, with at least two mutually orthogonal axes of articulation, one axis being substantially parallel to the axis of oscillation of the wing, and the other axis being transverse to the half-arms, so enabling, when the gear is axially displaced on the hinge pin in order to disengage the torque-limiting device, a corresponding inclination of the actuator half-arm, and hence a corresponding axial displacement of its rear end with respect to the hinge pin itself. For the same purpose, a corresponding ball-and-socket joint or Cardan joint may be provided also between the gear casing and the respective end of the actuator half-arm.

These and other characteristics of the invention and the advantages deriving therefrom will appear in greater detail from the ensuing description of an embodiment of the invention, which is illustrated merely to provide a non-limiting example in the attached drawings, in which:

FIG. 3 shows the foldable arm of the articulated actuator in elevation and with the front part in longitudinal section;

FIG. 4 illustrates the foldable arm of the articulated actuator in plan view and with the rear part in longitudinal section;

Figure 5:
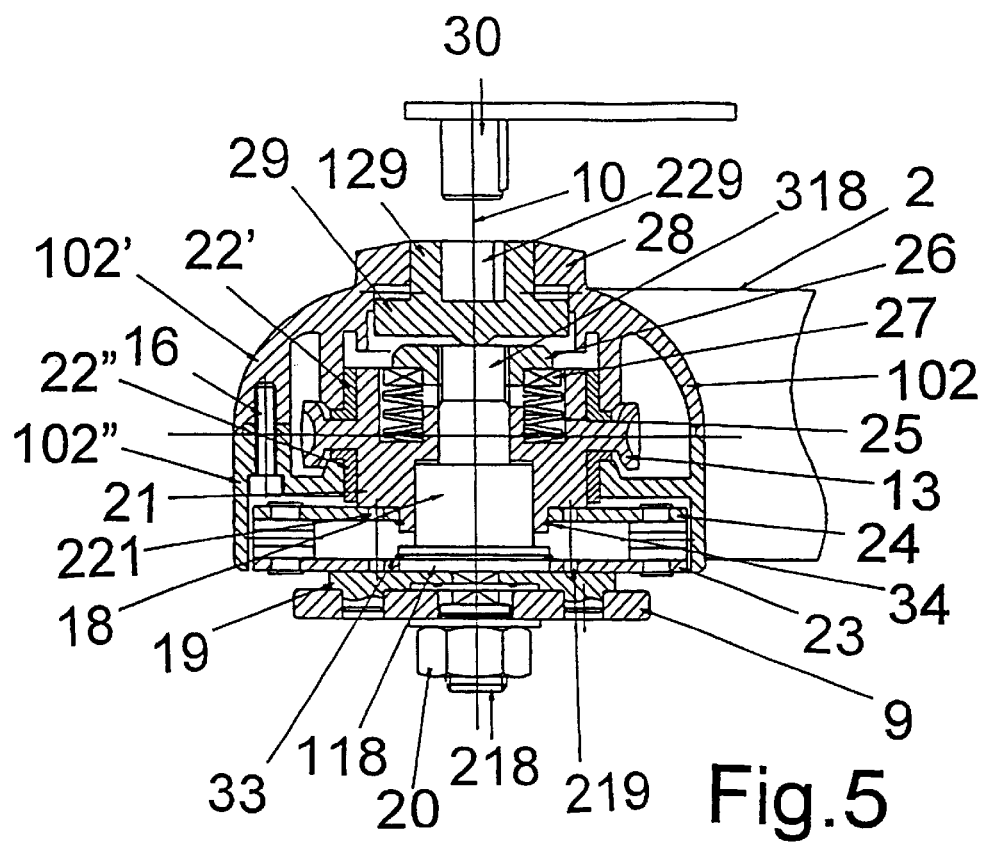
Figure 6:
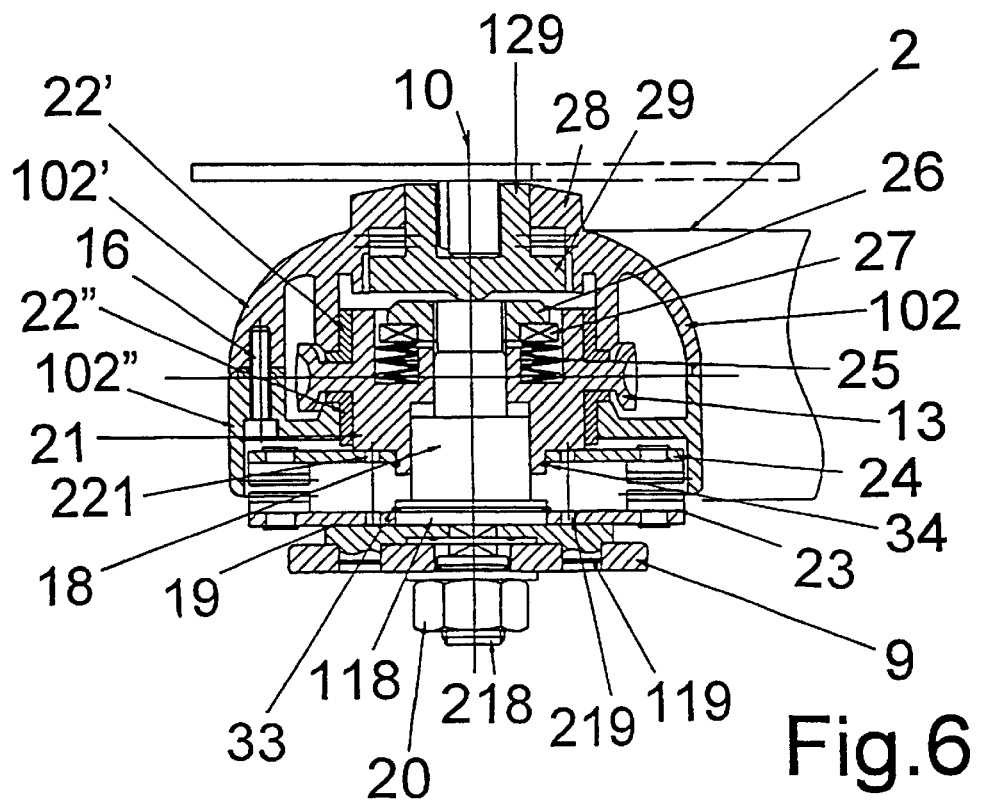
Figure 7:
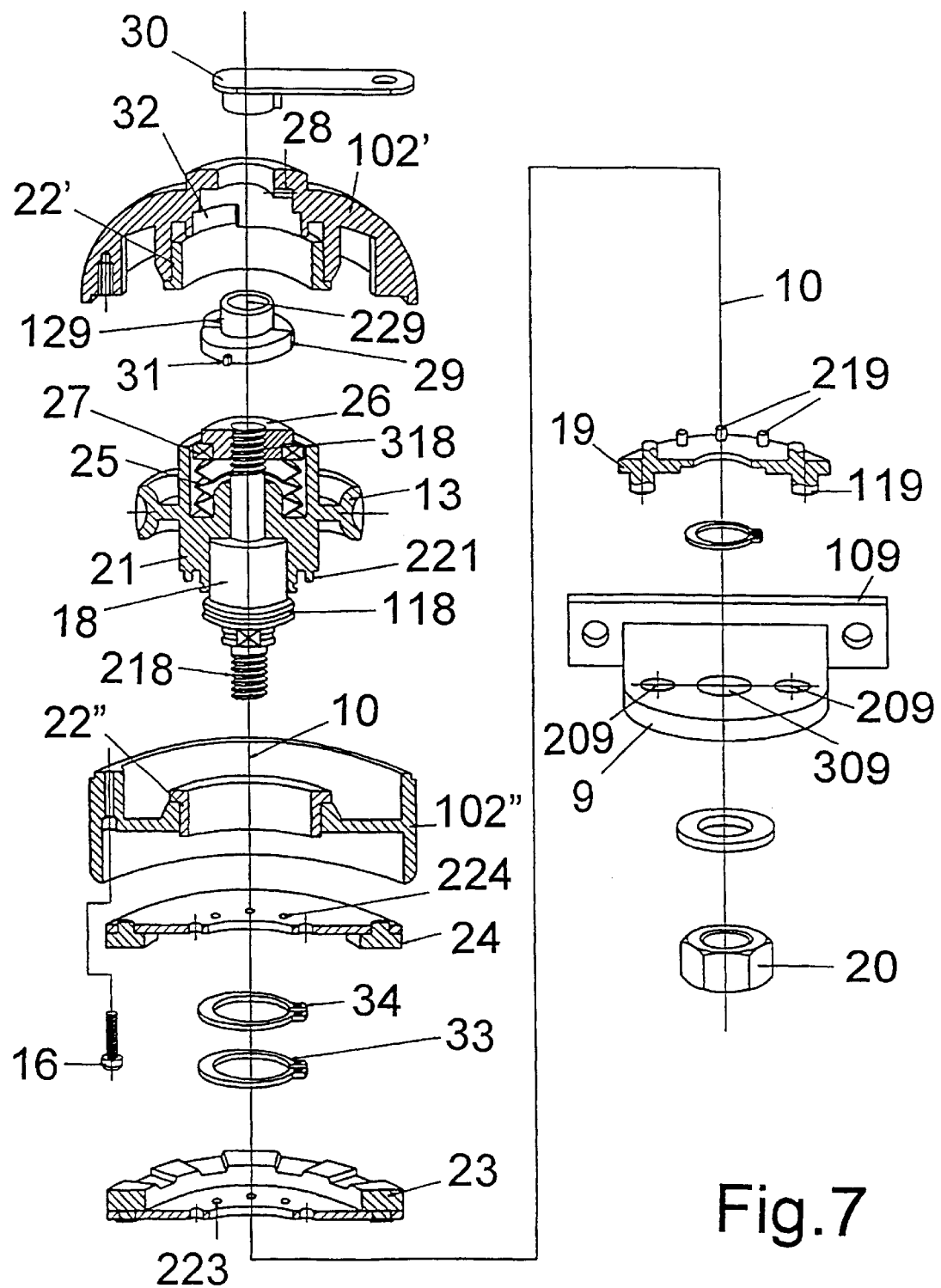
Figure 8:
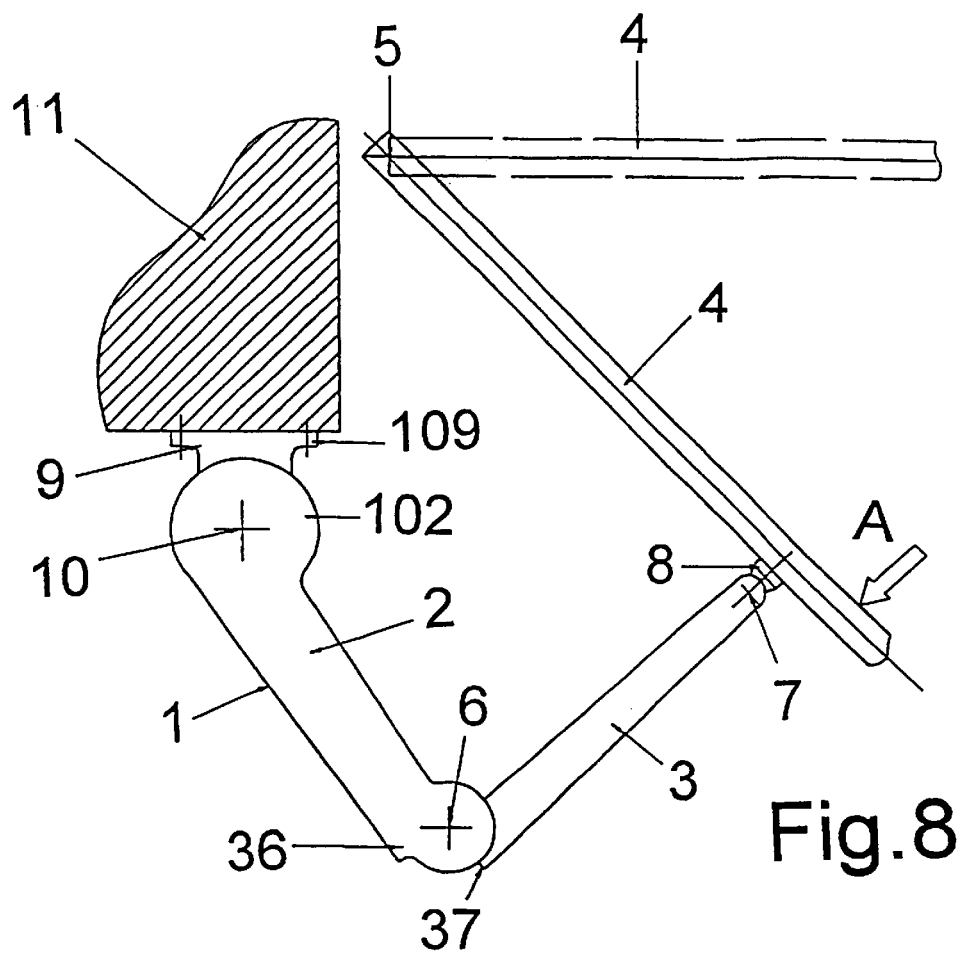
Figure 9:
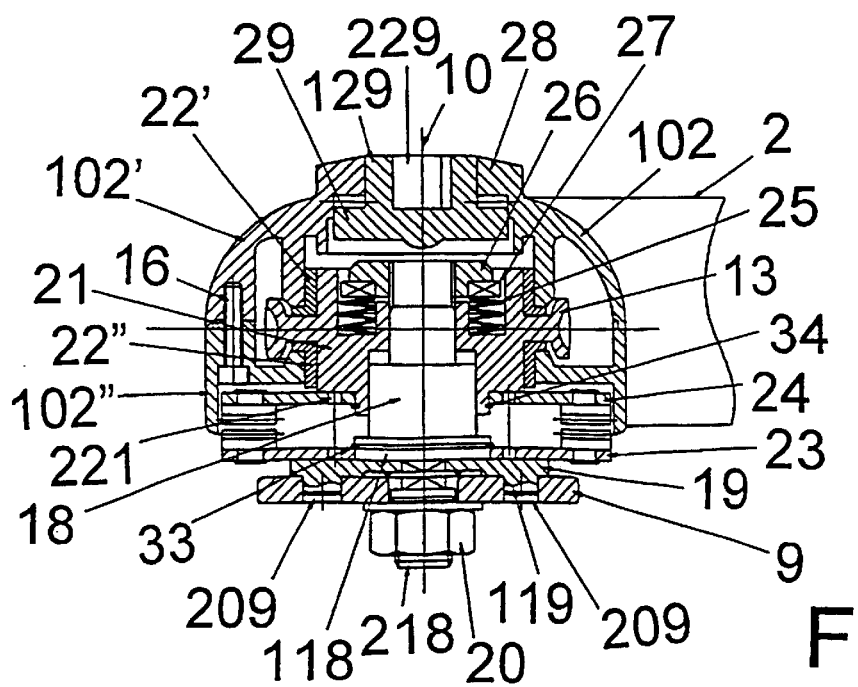
Figure 10:
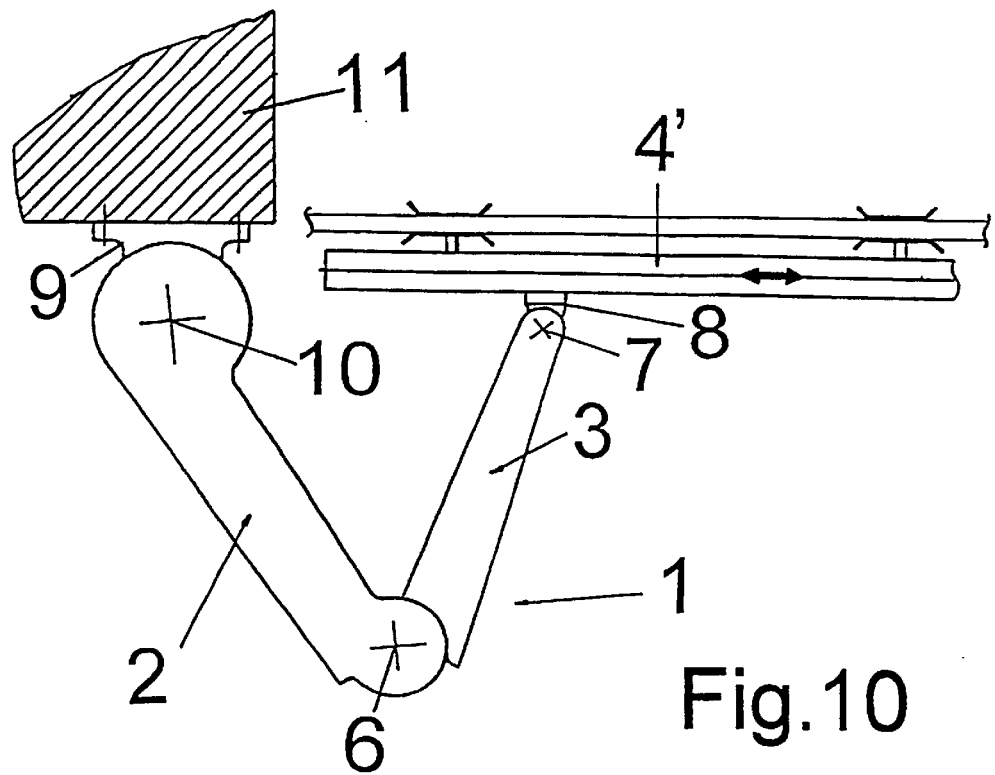

FIGS. 5 and 6 present a vertical section of the hinge of the rear end of the actuator half-arm to the corresponding fixed support, with the torque-limiting device set between the helical gear and the fixed support in the engaged position (FIG. 5) and in the disengaged position (FIG. 6);

FIG. 7 is an exploded perspective view of the hinge of the actuator half-arm to the corresponding fixed support;

FIG. 8 is a plan view of the articulated actuator in a particular condition of stress by means of an external force exerted manually on the wing;

FIG. 9 is a vertical section of the hinge of the rear end of the actuator half-arm to the corresponding fixed support, with the torque-limiting device in the position of automatic disengagement by the action of an excessive force of external stress;

FIG. 10 is a view of the actuator applied to a sliding wing; and

Figure 11:
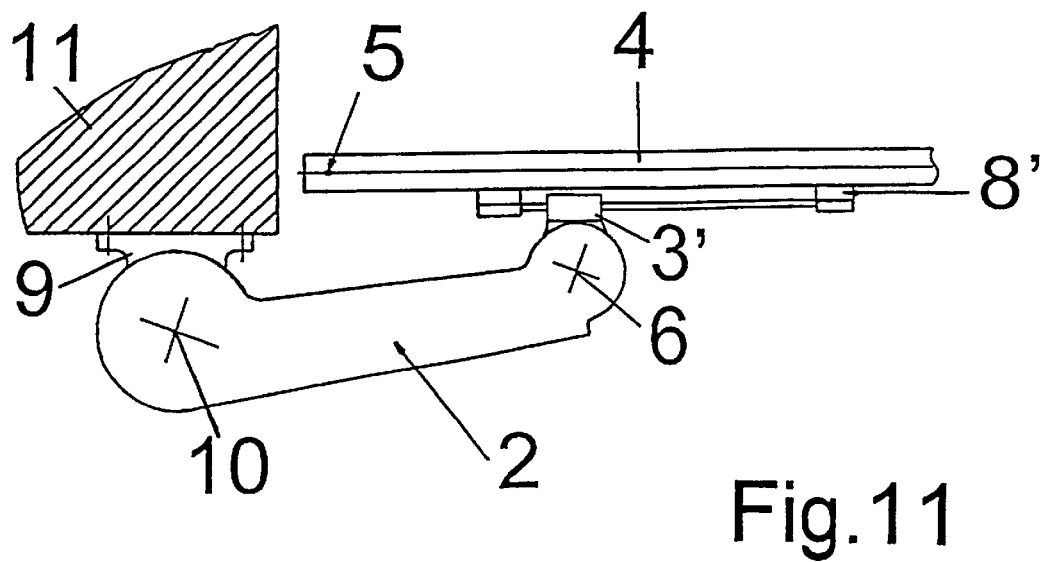

FIG. 11 illustrates a embodiment of the actuator having sliding connection to the wing.

With reference to the drawings, the articulated actuator for gates, doors, or any similar barrier with at least one wing for closing entrances or openings, or the like, consists of a foldable arm 1 which is substantially horizontal and comprises an actuator half-arm 2 and a drawing half-arm 3. The articulated actuator is applied to a gate or the like, the wing 4 of which may be opened and closed by being turned about a substantially vertical axis of oscillation 5. The rear end of the drawing half-arm 3 and the front end of the actuator half-arm 2 are articulated together by means of the intermediate articulated joint or pivot 6 for folding of the arm 1. This intermediate articulated joint 6 for folding is made like a ball-and-socket joint or a Cardan joint with at least two mutually orthogonal axes of articulation so as to enable, in addition to folding of the arm. 1 about an axis that is substantially vertical and is parallel to the axis of oscillation 5 of the wing 4, also a limited mutual folding of the two half-arms 2 and 3 in a substantially vertical plane, i.e., about an axis that is substantially horizontal and transverse to the foldable arm 1. The front end of the drawing half-arm 3 is connected by means of an articulation 7 to a bracket 8 fixed to the wing 4, the said articulation 7 also being made like a ball-and-socket joint or like a Cardan joint with at least two mutually orthogonal axes of articulation, so as to enable, in addition to the relative angular movement between the drawing half-arm 3 and the wing 4 about an axis that is substantially vertical and parallel to the axis of oscillation 5 of the wing 4, also a limited mutual inclination between the drawing half-arm 3 and the wing 4 in a vertical plane, i.e., about an axis that is substantially horizontal and is transverse to the foldable arm 1.

Figure 1:
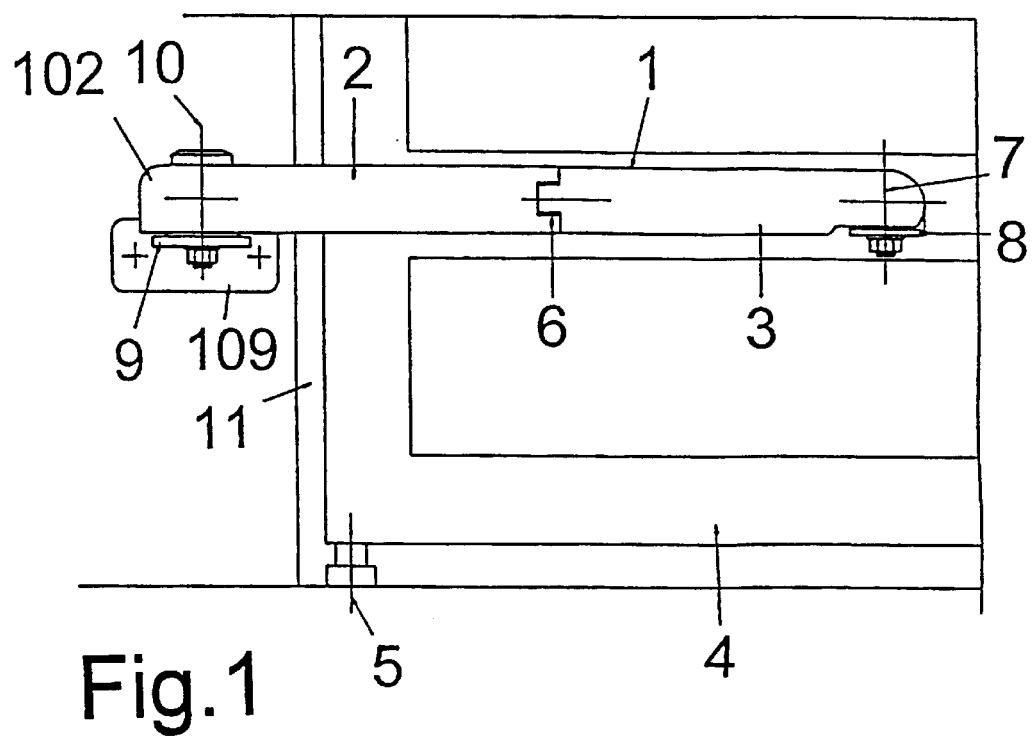
FIGS. 1 and 2 illustrate, as elevation and plan view, respectively, an articulated actuator according to the invention applied to the wing of a gate or door.

The rear end 102 of the actuator half-arm is hinged, as described in greater detail later, in an oscillating manner about a swinging axis or pivot 10 which is substantially vertical and parallel to the axis of oscillation 5 of the wing 4, as well as close to the said axis of oscillation 5 itself, on a supporting bracket 9 fixed, by means of its flange 109, to a post 11 or the like, and projecting horizontally from the said post 11 itself. The actuator half-arm 2 is made to oscillate in one direction and in the other about the swinging axis 10 by means of an irreversible turning pair consisting of a manoeuvring worm screw 12 and a corresponding helical gear 13. The helical gear 13 is coaxial with the swinging axis 10 of the actuator half-arm 2 and is blocked in a non-turning way to the fixed supporting bracket 109 by means of a torque-limiting device described hereinafter. The worm screw 12 engaged in the helical gear 13 is mounted in a turning way inside the actuator half-arm 2 and is driven in rotation by a reversible electric motor 14 by means of a reduction unit 15. The electric motor 14 and the reduction unit 15 are preferably mutually coaxial, as well as being coaxial with the worm screw 12, and are housed inside the actuator half-arm 2, which is for this purpose made hollow and is appropriately sized. In the example of embodiment illustrated, the actuator half-arm 2 is made up of two complementary shells set on top of one another and connected by means of screws, of which one 16 is illustrated in FIGS. 5, 6, 7 and 9. In these figures, designated by the numbers 102' and 102" are the two shells which form the hollow rear end 102 of the actuator half-arm 2 at the point corresponding to the hinge of the said half-arm 2 to the fixed supporting bracket 9. Designated by 17 in FIG. 4 is the supply cable of the electric motor 14. In these conditions, as the worm screw 12 is turned in one direction or the other by means of the electric motor 14 and the reduction unit 15, which are integrated in the actuator half-arm 2, given that the helical gear 13 is fixed, the actuator half-arm 2 is angularly displaced about the swinging axis 10 and causes the wing 4 to oscillate in a corresponding fashion, by means of the drawing half-arm 3, in one direction or the other about the axis of oscillation 5, so that the wing 4 is brought alternatively into an angular position of closing, illustrated by the solid lines in FIGS. 1 and 2, and in an angular position of opening, illustrated by the dashed lines in FIG. 2, whilst the foldable arm 1 folds in a corresponding way at the intermediate articulated joint 6.

In the embodiment illustrated, the hinge of the actuator half-arm 2 to the fixed supporting bracket 9 comprises a hinge pin 18 which is coaxial with the swinging axis 10 and is fastened to the fixed supporting bracket 9. For this purpose, the hinge pin 18 has a base flange 118, by means of which it rests on the supporting bracket 9 with interposition of a centring ring 19 provided at the bottom with pins 119 which insert in corresponding holes 209 of the supporting bracket 9. The hinge pin 18 has a threaded bottom end 218 which passes through the centring ring 19 and through a hole 309 of the supporting bracket 9, and on which a bottom locking nut 20 is screwed, which fixes the hinge pin 18 to the supporting bracket 9. The supporting bracket 9 can have two or more sets of holes 209, 309 for fixing the hinge pin 18, so that the latter can be mounted as desired in different positions that may be more or less close to the post 11 according to the dimensions of the post 11 itself and according to other particular requirements.

Mounted on the hinge pin 18, so that it is free to turn and to slide axially, is a gear casing 21 which is fixed to the helical gear 13. The said gear casing 21 is housed, in such a way that it can turn with respect to the actuator half-arm 2 but is not axially sliding with respect to the latter. in corresponding bushings 22' and 22" carried by the two shells 102' and 102" of the end 102 of the actuator half-arm 2. The bottom shell 102" of the said end 102 of the actuator half-arm 2 is open at the bottom at a point corresponding to the respective hinge to the fixed supporting bracket 9, whilst the said rear end 102 of the actuator half-arm 2 surrounds and embraces the helical gear 13 both laterally and at the top.

The gear casing 21 is connected to the fixed supporting bracket 9 (via the centring ring 19) by means of a torque-limiting device made up of two toothed annular disks 23 and 24 which are set on top of one another and are coaxial with each other, as well as being coaxial with the swinging axis 10. These annular disks are fixed, one 23 to the underlying centring ring 19, and the other 24 to the overlying gear casing 21. For this purpose, the bottom toothed annular disk 23 of the torque-limiting device has a ring of holes 223 in which corresponding top pins 219 of the centring ring 19 insert, whilst in a similar ring of holes 224 provided in the top toothed annular disk 24 of the torque-limiting device, corresponding bottom pins 221 of the gear casing 21 engage. The bottom toothed disk 23 of the torque-limiting device is axially fastened to the base flange 118 of the hinge pin 18 by means of a snap ring 33, whilst the top toothed disk 24 of the torque-limiting device is axially fastened to the gear casing 21 by means of another snap ring 34.

A pressure spring 25 housed in a top coaxial groove of the gear casing 21 around the hinge pin 18 and acting between the gear casing 21 and a spring-seat nut 26 screwed on the threaded top end 318 of the hinge pin 18 exerts axial thrust downwards on the gear casing 21 together with the top toothed disk 24 of the torque-limiting device and maintains the bottom ring gear of this disk 24 engaged in the facing top ring gear in the associated bottom toothed disk 23 of the torque-limiting device. The teeth of the two ring gears, which are facing one another and are mutually engaged, of the annular disks 23 and 24 of the torque-limiting device extend radially and have their sides inclined in the circumferential direction, as is evident from FIG. 7.

Between the pressure spring 25 and the spring-seat nut 26, a thrust bearing 27, for example of the roller type, is preferentially interposed in order to enable free rotation of the pressure spring 25 together with the gear casing 21 with respect to the spring-seat nut 26 itself, which is fixed to the hinge pin 18.

In the top part of the rear pivoted end 102 of the actuator half-arm 2, between the top end of the hinge pin 18 and an annular countercam part 28 provided around a top central opening of the top shell 102' of the actuator half-arm 2, is housed a face-cam disk 29 coaxial with the swinging axis 10. The said cam disk 29 rests with a bottom central projection on the head surface of the top end of the hinge pin 18, whilst on top it has a tubular central hub 129, by means of which it is guided, in a turning and axially sliding way, in the central opening of the annular countercam 28, which is fixed to the top shell 102' of the actuator half-arm 2. The bottom annular surface of the countercam 28 and the top annular surface of the cam disk 29 around its central hub 129 are kept in contact together by the action of the pressure spring 25, which exerts axial thrust downwards on the gear casing 21 and, together with the latter, on the entire end 102 of the actuator half-arm 2, and hence also on the countercam 28, with respect to the central hinge pin 18.

The face-cam disk 29 can be turned about the swinging axis 10 by means of a male wrench 30 which can be inserted in the corresponding non-round hole 229 of the top central hub 129 of the cam disk 29 itself through the central opening of the annular countercam 28. The profile of the wrench 30 and of the hole 229 of the hub 129 of the cam disk 29 can also be provided with a ciphering. Instead of the non-round hole 229, the top hub 129 of the cam disk 29 may have a non-round pin which projects at the top out of the end 102 of the actuator half-arm 2 through the central opening of the annular countercam 28, and on which a corresponding female wrench can be inserted. By means of the wrench 30 and the hub 129, the cam disk 29 can be turned through a certain angle about the swinging axis 10, for example position of emergency manual operation of the wing 4, the cam disk 29 pushes the end 102 of the actuator half-arm 2 axially upwards on the hinge pin 18, raising it together with the gear casing 21 and against the force of the engaging spring 25 to such an extent that it disengages the top toothed disk 24 of the torque-limiting device from the associated bottom toothed disk 23 and keeps it in this disengaged position, as illustrated in FIG. 6. In this position, the torque-limiting device 23, 24 is disengaged, and the helical gear 13, which is no longer blocked to the supporting bracket, 9, can turn freely on the hinge pin 18 together with the gear casing 21. In this condition, therefore, the wing 4 may be opened and closed manually about its axis of oscillation 5, and the foldable arm 1 is drawn, i.e., folded, and distended by the wing 4 itself.

The above-mentioned axial displacements of the gear casing 21 and of the corresponding end 102 of the actuator half-arm 2 are relatively small and are enabled, in particular, by the ball-and-socket joint 6 whereby the actuator half-arm 2 is articulated to the drawing half-arm 3, as described previously with reference to FIGS. 3 and 4.

In a possible embodiment of the invention, which may used, for example, for leaves of a length of up to approximately 3 metres, the articulated actuator is installed in such a way that, in the position of closing of the wing 4, the foldable arm 1 still remains at least slightly folded at the point corresponding to its intermediate articulated joint 6, whilst the wing 4 is blocked in the closed position by means of a lock, for example an electric lock.

If in this position (or in any other intermediate position between the opening and closing positions of the wing 4 and when the cam disk 29 is in its above-described angular position of normal motor-driven operation of the wing, i.e., when the torque-limiting device is engaged and blocks the helical gear 13 to the hinge pin 18 and to the supporting bracket 9, there is manually exerted on the wing 4, in the direction of opening or closing, a pressure, which is indicated, for example, by the arrow A in FIG. 8 and which exerts pressure on the actuator half-arm 2 with a corresponding maximum allowable moment sufficiently smaller than the moment that could cause damage to the foldable arm 1 or to its hinge on the supporting bracket 9, then the axial component of the pressure between the cooperating inclined sides of the teeth of the toothed annular disks 23, 24 of the torque-limiting device exceeds the axial force of the engaging spring 25 and causes an axial displacement upwards of the top toothed annular disk 24 together with the gear casing 21 and to such an extent that it disengages the said disk 24 from the underlying fixed toothed annular disk 23, as illustrated in FIG. 9. The torque-limiting device 23, 24 is thus automatically disengaged and enables a jerking rotation of the gear casing 21 together with the helical gear 12 on the hinge pin 18. The actuator half-arm 2 is thus rotated without causing damage about its swinging axis 10 by the action of the opening or closing force exerted, in particular manually, on the wing 4, for instance in the event of an emergency represented by a failure of the operating motor or by an absence of electric current.

In order to prevent, in such cases of emergency, the need to exert on the wing 4 the relatively large pressure necessary for disengaging the torque limiting device, as described above with reference to FIGS. 8 and 9, and when the hinge of the actuator half-arm 2 is accessible, it is possible to disengage the torque-limiting device 23, 24 by turning the cam disk 29 by means of the wrench 30 and bringing it into its end angular position corresponding to the manual emergency operation of the wing 4, as described previously and as illustrated in FIG. 6. In this position, the actuator half-arm 2 is free to turn about its swinging axis, and the wing 4 can be easily closed and opened by hand.

Figure 2:
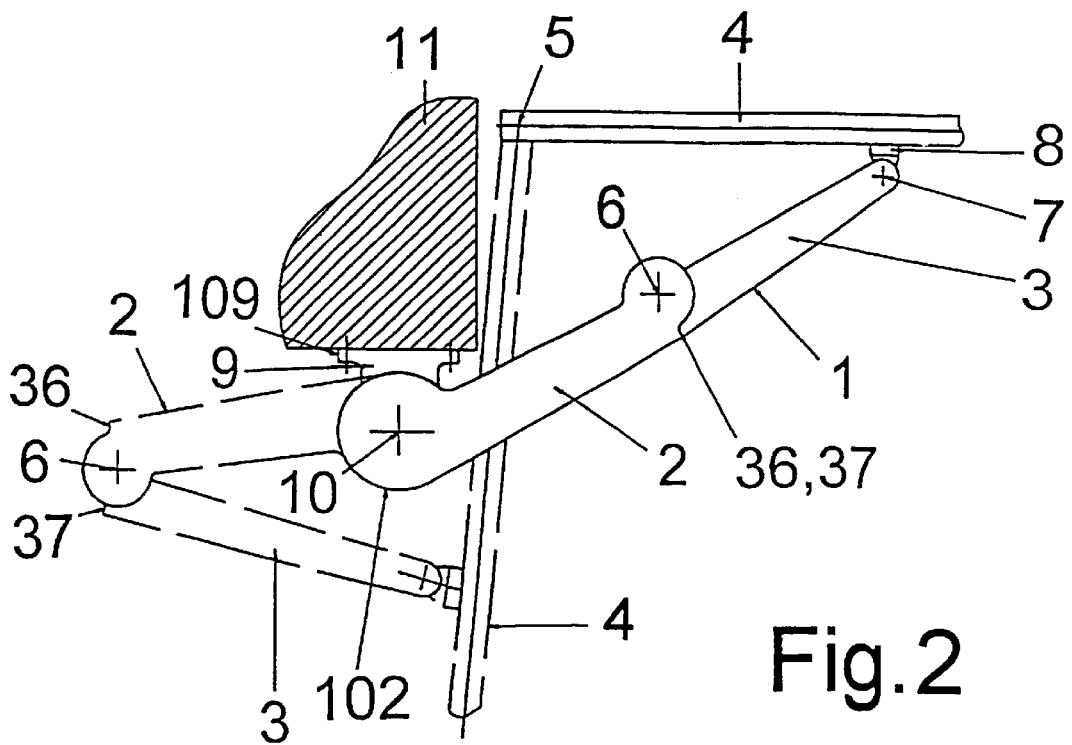

According to another possible embodiment of the invention, illustrated in FIG. 2 and used preferably for leaves having a length smaller than approximately 2 metres, the articulated actuator is installed in such a way that its foldable arm 1 is distended completely in the closed position of the wing 4; i.e., the centres of articulation 6, 7, 10 are aligned according to a straight line as illustrated in FIG. 2. This position of alignment of the centres of the articulations 6, 7, 10 is defined by cooperating detents 36, 37 provided on the two half-arms 2 and 3. In this case, the foldable arm 1 of the. actuator functions, in its completely distended position, as a stay which blocks the wing 4 in the closed position. The wing 4 may be opened at least partially only by means of the electric actuating motor 14, or else, in the event of an emergency, manually after the torque-limiting device 23, 24 has been disengaged by means of the wrench 30 and the cam disk 29, as described previously.

The above-described examples of installation of the articulated actuator according to the invention refer to gates, doors or the like, with a single wing. In the case of gates, doors or the like provided with two leaves, which in particular may be blocked together by means of an electric lock, the articulated actuator according to the invention may be applied to both leaves in the same way as described previously with reference to FIG. 2 (foldable arm 1 distended in the position of closing of the wing), or else with reference to FIGS. 8 and 9 (foldable arm 1 at least slightly folded in the position of closing of the wing).

According to a preferred embodiment of the invention, however, to one of the leaves, in general to the one opened last, an actuator is applied in the way described with reference to FIG. 2 (foldable arm 1 completely distended, with articulation points 6, 7 and 10 aligned with one another in the position of the closing of the wing), whilst to the other wing, in general the one that is opened first, an actuator is applied in the way described with reference to FIGS. 8 and 9 (foldable arm 1 still at least slightly folded in the position of closing of the wing).

The articulated actuator according to the invention, among other things, presents the advantages described in that follows. The torque-limiting device 23, 24 set between the helical gear 13 and the fixed support 9 of the foldable arm 1 constitutes both a safety device against overloading and damage by the action of excessive external forces, and a device for release of the actuator in order to enable emergency manual angular displacement of the wing 4. The said torque-limiting device makes it possible to reduce the size and the cost of the irreversible manoeuvring turning pair made up of the worm screw 12 and the helical gear 13, and consequently enables reduction also of the size and cost of the reduction unit 15 set between the said pair 12, 13 and the electric actuating motor 14. The above-mentioned reductions in size enable the motor 14 and the reduction unit 15 to be incorporated in the actuator half-arm 2, or at least favours such an assembly, further reducing the cost and enabling execution of the articulated actuator as a compact, integrated constructional unit of reduced dimensions which does not require separate installation of the motor-reduction unit assembly and may be installed also on posts or other supports of small size. At the same time, the slight increase in the size of the foldable arm 1, an increase which is necessary for the integration of the motor 14 and the reduction unit 15 in the actuator half-arm 2, bestows on the said foldable arm 1 a greater sturdiness and thus enables its utilization in the completely distended condition as a stay arm for blocking the wing 4 in the closed position, as described with reference to FIG. 2, so rendering an electric lock superfluous for this wing.

The various possibilities of installation of the articulated actuator on gates or doors with a single wing or with two leaves enable optimization of its use and its adaptation to the various needs that may arise and to the particular requirements of users.

In FIG. 10, the articulated actuator is applied to a sliding wing 4'. As disclosed above, the rear end of the drawing half-arm 3 and the front end of the actuator half-arm 2 are articulated together by means of the intermediate articulated joint 6 for folding of the arm 1. The axis 6 is substantially vertical and is parallel to the sliding plane of the wing 4'.

FIG. 11 shown the articulated actuator according to the invention, with the actuator half-arm 2 applied to the wing 4 (which may be opened and closed by being turned about the axis of oscillation 5) by means of a drawing connection 3' which is made of a carriage sliding on a guide 8'.

The front end of the actuator half-arm 2 and the carriage 3' are articulated together by means of the intermediate articulated joint 6. This intermediate articulated joint 6 for folding can be made like a ball-and-socket joint or a Cardan joint with at least two mutually orthogonal axes of articulation, as disclosed above for the other embodiments.

The rear end of the actuator half-arm is hinged, as described above, in an oscillating manner about the swinging axis 10 which is substantially vertical and parallel to the axis of oscillation 5 of the wing 4', as well as close to the said axis of oscillation 5 itself, on the supporting bracket 9 fixed to the post 11 or the like.

What is claimed is:

1. An actuator for operation of gates, doors or closing barriers provided with at least one rotating or sliding wing, the actuator comprising an arm which is designed to be hinged to a fixed support at a swinging axis and connected to the wing, said arm comprising a first half-arm, which has a rear end designed to be hinged to the fixed support by a first pivot, so as to be angularly displaceable about said swinging axis, and has a front end hinged to a connection to the wing by a second pivot, the actuator further comprising an electric actuating motor and a reduction unit, which are carried by the first half-arm, wherein said motor and reduction unit are connected to said first pivot for rotating the first half-arm about the swinging axis to move the connected wing.

2. The actuator according to claim 1, wherein the connection to the wing comprises a second half-arm, which is articulated with a front end to the wing and with a rear end, by an intermediate folding articulated joint, to the front end of the first half-arm, the first half-arm and second half-arm forming a foldable arm.

3. The actuator according to claim 2, wherein one or both of the intermediate folding articulated joint for folding the foldable arm and an articulated joint for articulation of the second half-arm with respect to the wing is a ball-and-socket joint or a cardan joint with at least two axes of articulation which are mutually orthogonal, one axis being substantially parallel to the axis of oscillation of the wing, and the other being substantially horizontal and transverse to the foldable arm.

4. The actuator according to claim 2, wherein the actuator is installed on a single wing provided with a lock, in a way whereby the foldable arm still remains at least slightly folded in a position of closing of the wing.

5. The actuator according to claim 2, wherein the actuator is installed on a single wing having no lock, in a way whereby the foldable arm distends completely in a position of closing of the wing, so that the centres of hinging of the first half-arm to the corresponding fixed support and of articulation of the second half-arm with respect to the wing, as well as of the intermediate folding articulated joint between said first and second half-arms, are aligned according to a straight line, whereby the foldable arm in the distended position works as a stay for blocking the wing.

6. The actuator according to claim 5, wherein a completely distended condition of the foldable arm in the position of closing of the wing is defined by abutments between the first and second half-arms.

7. The actuator according to claim 1, wherein the swinging axis of the arm is close to and substantially parallel with an axis of oscillation of the wing.

8. The actuator according to claim 1, wherein the electric actuating motor and the reduction unit are housed in a recess of the first half-arm.

9. The actuator according to claim 1, wherein the electric actuating motor operates, via the reduction unit, a maneuvering worm screw which is carried by the first half-arm and meshes with a corresponding helical gear coaxial with said first pivot.

10. The actuator according to claim 9, wherein the helical gear is fastened in a non-turning way to the fixed support of the first half-arm.

11. The actuator according to claim 9, wherein the helical gear is mounted by a torque-limiting device regulated so as to enable rotation of the helical gear together with the associated worm screw, and hence together with the first half-arm when the first half-arm is acted upon in rotation by external forces greater than a pre-set allowable maximum stress.

12. The actuator according to claim 11, wherein the torque-limiting device can release the first half-arm intentionally from the fixed support and thus enable free and easy rotation of the first half-arm about the swinging axis when it is desired to move the wing in cases of emergency or in the event of absence of electric current.

13. The actuator according to claim 12, wherein the torque-limiting device, in addition to being automatically disengageable under the action of a pre-set maximum safety moment exerted on the first half-arm, is associated to releasing means for pre-arranging the emergency maneuver, which can be operated manually, by an appropriate ciphered wrench, and are designed to disengage said torque-limiting device.

14. The actuator according to claim 11, wherein the helical gear is fixed to a gear casing, on which the rear hinged end of the first half-arm is mounted in a turning way, said gear casing in turn being mounted so that it is free to turn and to slide axially on a hinge pin, whilst the torque-limiting device is made up of two toothed annular disks, which are set one on top of the other and are coaxial with the hinge pin, one of said annular disks being designed to be fixed to the fixed support of said first half-arm and the other of said annular disks being fixed to the gear casing, said annular disks meshing together by ring gears which are set facing one another head on and are provided with radial teeth having inclined sides, there being provided an engaging spring which exerts axial thrust on the gear casing in the direction of mutual engagement of the two toothed annular disks set on top of one another, consequently blocking the helical gear to the hinge pin in such a way that the helical gear is not able to turn, but enabling mutual disengagement of the two toothed disks by a corresponding movement of axial yielding of the gear casing against the action of the engaging spring, hence enabling jerking rotation of the helical gear about the hinge pin as a result of a maximum pre-set torque exerted on the first half-arm and thereby, by the worm screw, on the helical gear.

15. The actuator according to claim 14, wherein the hinge pin is coaxial with the swinging axis of the first half-arm and designed to be fastened to the fixed support of said first half-arm.

16. The actuator according to claim 14, wherein the two toothed disks of the torque-limiting device can be disengaged from one another by emergency releasing means which may be operated manually and are designed to axially displace and withhold the gear casing against the action of the engaging spring in a position of disengagement of the torque-limiting device, consequently enabling the gear casing, and hence the helical gear, to turn freely together with the first half-arm about the swinging axis.

17. The actuator according to claim 16, wherein the emergency releasing means for disengaging the torque-limiting device consist of a face cam mounted, so that it can be turned manually, between the gear casing or a part of the hinged rear end of the first half-arm, and the head end of the hinge pin fixed to the support of the first half-arm, said cam having a profile such as to enable, in a first angular position of the said cam, mutual engagement of the two toothed disks of the torque-limiting device by the action of the respective engaging spring, whilst said cam displaces and withholds, in a second angular position, the gear casing axially on the hinge pin and against the action of the engaging spring in a position of disengagement of the torque-limiting device.

18. The actuator according to claim 17, wherein the face cam consists of a cam disk held tight axially and elastically, by the engaging spring, between the head end of the hinge pin and an annular countercam fixed to the first half-arm, said cam disk being turnable manually by a wrench that can mate with the cam disk in rotation through a central opening of the annular countercam.

19. The actuator according to claim 14, further comprising means that enable the rear end of the first half-arm to follow the axial displacements of the gear casing along the hinge pin.

20. The actuator according to claim 1, wherein the arm is connected to the wing by a carriage which slides parallel to the plane of the wing.

21. A closing system for gates, doors, and barriers provided with two rotating or sliding wings, which can be connected together by a lock and each of which is operated by an actuator comprising a foldable arm including a first half-arm, which has a rear end designed to be hinged to a fixed support at a swinging axis so as to be angularly displaceable about the swinging axis, and a second half-arm, which has a front end designed to be hinged to a wing and a rear end designed to be hinged to a front end of the first half-arm by an intermediate folding articulated joint, the actuator further comprising an electric actuating motor and a reduction unit, both of which are carried by the first half-arm, wherein the actuator on one wing has a foldable arm that is completely distended when said one wing is in a closed position, so that centers of hinging of the first half-arm to the fixed support, of the second half-arm to said one wing, and of the intermediate folding articulated joint between the first and second half-arms, are aligned according to a straight line, whereby the foldable arm, while it is completely distended, operates as a stay for blocking said one wing, and wherein the actuator on the other wing has a foldable arm that remains at least slightly folded when said other wing is in a closed position.

22. The closing system according to claim 21, wherein, during the opening the two wings from respective closed positions, said other wing is opened first and said one wing is opened last.

* * * * *